United States Patent [19]

Baldwin et al.

[11] 4,405,464

[45] Sep. 20, 1983

[54] PROCESS FOR THE REMOVAL OF SELENIUM FROM AQUEOUS SYSTEMS

[75] Inventors: Roger A. Baldwin, Warr Acres; John C. Stauter; Donald L. Terrell, both of Edmond, all of Okla.

[73] Assignee: Kerr-McGee Nuclear Corporation, Oklahoma City, Okla.

[21] Appl. No.: 297,634

[22] Filed: Aug. 31, 1981

[51] Int. Cl.$^3$ ............................ C02F 1/52; C02F 1/70
[52] U.S. Cl. ............................ 210/717; 210/719; 210/724; 210/912; 75/109; 75/121; 423/509; 423/510
[58] Field of Search .................. 75/109, 121; 210/719, 210/724, 757, 912, 722, 737, 717; 423/508–510

[56] References Cited

U.S. PATENT DOCUMENTS

| | | | |
|---|---|---|---|
| 1,529,260 | 3/1925 | Lubowsky | 423/92 |
| 2,121,992 | 6/1938 | Sterba | 423/81 |
| 2,889,206 | 6/1959 | Hobin | 423/510 |
| 2,930,678 | 3/1960 | Oberbacher et al. | 423/510 |
| 3,130,012 | 4/1964 | Prater et al. | 423/510 |
| 3,433,596 | 3/1969 | Wagenmann et al. | 423/510 |
| 3,575,853 | 4/1971 | Gaugham et al. | 210/46 |
| 3,933,635 | 7/1975 | Marchant | 423/510 |
| 3,997,439 | 12/1976 | Ayukawa | 210/50 |
| 4,026,797 | 5/1977 | Nikolic et al. | 210/50 |
| 4,066,542 | 1/1978 | Ayukawa | 210/51 |
| 4,097,377 | 6/1978 | Ayukawa | 210/50 |
| 4,169,053 | 9/1979 | Sakakibara et al. | 210/724 |

FOREIGN PATENT DOCUMENTS

53-115557 10/1978 Japan .................................. 210/724

OTHER PUBLICATIONS

U.S. Environmental Protection Agency, "Manual of Treatment Techniques for Meeting the Interim Primary Drinking Water Regulations," May 1977, pp. 29–31.
Testimony by L. G. Stauter, New Mexico Water Quality Control Commission, 8/28/80.

*Primary Examiner*—Peter A. Hruskoci
*Attorney, Agent, or Firm*—William G. Addison

[57] ABSTRACT

A process for reducing the concentration of selenium ions in the Se(VI) oxidation state in an aqueous solution. The aqueous solution is admixed with a quantity of metallic iron. The iron reduces the selenium ions from the Se(VI) oxidation state to a lower oxidation state and then dissolves in the aqueous solution. If the pH level of the aqueous solution is above about 2.3, the selenium ions are reduced to at least the Se(IV) oxidation state and the dissolved metallic iron hydrolyses to form an iron hydroxide that precipitates. The precipitated material is separated from the aqueous solution to provide a solution having a lower concentration of selenium ions. If the pH level of the aqueous solution is below about 2.3, no iron hydrolysis is observed to occur. At least a portion of the selenium in the Se(VI) oxidation state is believed to be reduced to the elemental state. The elemental selenium then is separated from the aqueous solution to provide a solution having a lower concentration of selenium ions.

8 Claims, No Drawings

PROCESS FOR THE REMOVAL OF SELENIUM FROM AQUEOUS SYSTEMS

BACKGROUND OF THE INVENTION

1. Field of the Invention

This invention relates to a process for reducing the concentration of selenium ions in aqueous systems and more particularly to removal of selenate ions from leaching solutions or mine water prior to discharge of the aqueous stream into the ground water system.

2. Description of the Prior Art

Pollution and pollution control have become increasingly more important in recent years, not only because people are more sensitive to their environment, but also because the amount of pollution has increased markedly in some instances. Pollution represents a potential health hazard and a deterioration in the quality and beauty of our surroundings. It is one of the undesired consequences of our rising production, our modern civilization and out increased utilization of natural resources.

Water is mankind's most valuable resource. Any use of water nearly always results in a decrease in the quality of the water through the addition of pollutants. These pollutants can comprise dissolved inorganic and organic chemicals, inorganic and organic particulate material and absorbed gases. In general, several methods are available for removing pollutants. These methods include such processes as gravity sedimentation, flotation, filtration, biological oxidation, ion exchange, activated adsorption, reverse osmosis, electrodialysis, distillation and chemical precipitation. Several soluble inorganic pollutants present a problem that generally is not solved by gravity sedimentation, flotation, filtration or biological oxidation.

Stringent standards for the maximum level of pollutants in water to be used for drinking or released into ground water system are being promulgated by federal and state agencies. For example, the current allowable maximum concentration level for selenium in drinking water set by federal standards is 0.01 milligrams per liter. The state of New Mexico has proposed a selenium standard of 0.05 milligrams per liter for discharge into the ground water system of the state.

An increase in pollutant concentration is, in itself, not significant provided that processing methods are available to reduce the pollutant concentration to an acceptable level. One method employed to remove or substantially reduce the concentration of soluble inorganic pollutants such as heavy metals in water is chemical precipitation of the metals as oxides or hydroxides. This precipitation generally is effected by the addition of lime, alum or an iron salt to the water at an appropriate pH.

Other treatment methods, such as ion exchange, reverse osmosis, electrodialysis or distillation also can be effective in removing various pollutants. However, these methods are considerably more expensive and generally narrower in applicable scope than is desirable for the treatment of great volumes of water as is necessitated in many industrial operations.

It is known that selenium ions can be removed from aqueous systems employing chemical precipitation if the selenium is present in the selenite or Se(IV) oxidation state. The percentage of selenite ions removed from an aqueous solution has been found to be better when an iron salt is employed to effect the chemical precipitation rather than lime or alum. The iron salt can be present either as a ferric or ferrous sulfate, chloride or hydroxide.

In particular, experimental studies have shown that chemical precipitation employing ferric sulfate can achieve a significant removal of selenium in the selenite oxidation state from an aqueous stream. More particularly, when a river water containing 0.03 milligrams per liter of selenium in the Se(IV) oxidation state and having a pH of 5.5 is treated with 30 milligrams of ferric sulfate per liter, about 85 percent of the selenium is removed from the water (U.S. Environmental Protection Agency, "Manual of Treatment Techniques for Meeting the Interim Primary Drinking Water Regulations," May, 1977, pages 29–31).

U.S. Pat. No. 3,933,635 discloses a process for removing selenium ions present in the selenite oxidation state from acidic process waters. The acidic process water, having a 1.0 to 4.0 pH, is reacted with a metallic reducing agent at a temperature in the range of from about 25° C. to about 85° C. for a sufficient time to reduce the soluble selenium in the selenite oxidation state to insoluble elemental selenium. Preferably, the temperature is maintained in the range of from about 50° C. to about 70° C. The reducing agent can comprise aluminum, iron or zinc in an appropriate form, such as, for example, a powder, scrap fragments, granules, wools and the like. The preferred reducing agent for selenium in the selenite oxidation state is zinc powder.

By way of contrast, laboratory tests and pilot plant studies have shown that chemical precipitation employing alum, lime, ferrous sulfate or ferric sulfate substantially is ineffective for removing selenium in the selenate or Se(VI) oxidation state from water. Studies on water having a 0.03 to 10 milligram per liter selenium concentration in the Se(VI) oxidation state have shown that the conventional chemical precipitation methods remove less than 10 percent of the selenium from the water (U.S. Environmental Protection Agency, "Manual of Treatment Techniques for Meeting the Interim Primary Drinking Water Regulations," May, 1977, pages 29–31).

It has been shown that the selenium ions in the selenate oxidation state can be removed by ion exchange or reverse osmosis. As previously indicated, these methods are prohibitively expensive when large volumes of an aqueous solution must be treated. Further, both methods produce a contaminated regeneration effluent that requires further treatment for selenium fixation or removal before disposal. Thus, the selenium removal problem still exists but in a more highly concentrated solution.

In view of the various problems associated with the removal of selenium ions in the selenate or Se(VI) oxidation state it would be desirable to develop a process by which the selenate ions can be removed by chemical precipitation.

SUMMARY OF THE INVENTION

The surprising discovery now has been made that it possible to substantially reduce the concentration of selenium ions in the selenate oxidation state in an aqueous solution by contacting the aqueous solution with metallic iron. The metallic iron reduces the selenium ions from the selenate or Se(VI) oxidation state to a reduced selenium species. The reduced selenium species separates from the aqueous solution to provide an aqueous solution having a significantly lower selenium ion concentration.

The pH level of the aqueous solution can be in the range of from about 1.0 to about 6.0. Preferably, the pH is maintained in the range of from about 3.0 to about 5.5.

DESCRIPTION OF THE PREFERRED EMBODIMENT

In accordance with the present invention, a method for substantially removing selenium ions in the selenate oxidation state from aqueous solutions is provided. The aqueous solutions can comprise a process effluent such as, for example, water from a uranium, copper or molybdenum leaching operation, mine seepage or drainage water or any other aqueous stream which contains selenium ions in the Se(VI) oxidation state. To facilitate a description and understanding of the process of the present invention, specific reference hereinafter will be made to a selenium-containing aqueous solution comprising mine water which contains mostly selenium ions in the Se(VI) oxidation state. A substantial portion of any selenium in its Se(IV) oxidation state also is removed by this process.

The mine water is contacted with a quantity of metallic iron in a reduction zone. The reduction zone can comprise any suitable vessel or tank. The metallic iron should be present in a quantity in excess of the stoichiometric requirements to reduce all of the selenium ions in the Se(VI) oxidation state to the Se(IV) or lower oxidation state. The metallic iron can be present in any convenient form, however, a particulate or shredded iron is preferred to provide a large surface area for contact with the mine or other selenium-containing water.

While the reduction reaction of the selenium ions in the mine water will occur under acidic to near neutral conditions, it has been found that the rate of the reaction generally is greater with increased acidity of the water. Thus, if the water is alkaline or neutral it preferably is acidified through the addition of a quantity of a mineral acid, such as for example, hydrochloric acid or sulfuric acid or any other acidic solution such as acidic mill process waters. Preferably, the pH level of the selenate-containing mine water is adjusted to a level in the range of from about 1.0 to about 6.0 and most preferably between about 3.0 to 5.5.

The specific effects of the temperature of the mine water upon the rate of the reduction reaction has not been determined. The process has been operated in the range of from about 15° C. to about 35° C. and it would be expected to operate at elevated temperatures. For economic reasons, the process of the present invention preferably is effected at a temperature in the range of from about 15° C. to about 30° C. and most preferably at a temperature in the range of from about 15° C. to 25° C. or at the water's natural ambient temperature.

The selenium ions in the Se(VI) oxidation state are reduced by the metallic iron to at least the Se(IV) oxidation state. Simultaneously, the metallic iron is oxidized to a higher valence state. As the metallic iron is oxidized, it can hydrolyze to form ferric hydroxide which precipitates from the mine water. While the specific mechanism presently is unknown, it is believed that the selenium is either precipitated on the iron by a cementation process or precipitated on the ferric hydroxide by adsorption of the reduced selenite ions upon the surface of the precipitate to form an insoluble iron selenite. In excess of 99 percent of the selenium ions in the (VI) oxidation state can be removed from the mine water by the process of the present invention.

Following selenium reduction, the soluble or precipitated iron hydroxide, depending upon process pH, can be removed from the mine water by any technique known to those individuals skilled in the art of liquid-solid separations. The precipitate can be separated from the mine water by, for example, coagulation, filtration, decantation, centrifugation or the like.

In the event the pH level of the aqueous solution being treated is below about 2.3, no in-situ iron precipitate is observed. In this instance, it is believed that the selenium ions that are reduced from the Se(VI) oxidation state may undergo reduction completely to elemental selenium which then precipitates from the aqueous solution directly onto the iron reductant.

After reduction and separation of a substantial portion of the selenium, the pH level of the mine water or other treated aqueous solution can be adjusted to a generally neutral level for removal of iron and other species by hydrolysis or coagulation to permit its discharge into the ground water system. The pH adjustment and precipitation can be accomplished through the addition of lime or other caustic compounds. The pH adjustment can result in the precipitation of sulfate, as for example calcium sulfate, or additional heavy metals as oxides or hydroxides, if any are present. Any additional precipitates can be separated from the aqueous solution by the previously described separation methods prior to use in industrial operations or before discharge into the ground water system.

Surprisingly it has been found that the process of the present invention is significantly more effective than treatments effected with other reducing agents and particularly some which are higher in the electromotive series. To further illustrate the process of the present invention and not by way of limitation, the following examples are provided.

EXAMPLE I

A quantity of water containing 0.440 milligrams selenium per liter, as determined by chemical analysis, continuously is introduced into a laboratory scale continuous reduction column at a feed rate of 18 milliliters per minute. The average residence time of the water in the metal reduction column is about 15 minutes. A quantity of metallic iron powder in excess of the stoichiometric quantity necessary to reduce all the selenium present in the water to the Se(IV) or lower valence state is loaded into the reduction column as a treating agent. The reduction column is followed by a hydrolysis and coagulation unit in which ferric ions, particularly sulfate, are converted into iron hydroxide floccules. The selenium ions comprise about 90 percent Se(VI) and about 10 percent Se(IV). The natural pH level of the water is about 8. A series of tests are performed in which the pH level of the water is adjusted to various lower pH levels through the addition of sulfuric acid. The column is operated for a sufficient time after each pH adjustment (generally 8 hours) to ensure that steady state operation has been achieved to thereby provide results that are representative of continuous operation. The column is operated at laboratory ambient temperature (about 21°–23° C.). A quantity of the effluent from the reduction column periodically is sampled and analyzed for selenium content. A quantity of the solution from the hydrolysis and coagulation unit also periodically is sampled and analyzed for selenium content. A decrease in the selenium ion concentration of the effluent from the reduction column indicates that selenium ions have been reduced to a lower valence state and removed by either cementation upon the treating agent or precipitation with the oxidation product of the treating agent. A decrease in the concentration of the selenium ions after the hydrolysis and coagulation treatment indicates that a quantity of selenium ions in the Se(VI) oxidation state were reduced to the Se(IV) oxidation state or lower valence state in the reduction column and then removed by the floccules formed from the hydrolyzed ferric sulfate. The results of each of the analyses and the various treatment conditions are set forth in Table I.

TABLE I

| Test No. | pH | Reduction Column Effluent Se Concentration, mg/l | Se Removed In Reduction Column, mg/l | Reduction Column Extraction Efficiency, % | Hydrolysis[1] & Coagulation Effluent Se Concentration, mg/l | Se Removed In Hydrolysis & Coagulation Unit, mg/l | Cumulative Extraction Efficiency, % |
|---|---|---|---|---|---|---|---|
| 1 | 5.6 | 0.014 | 0.426 | 97 | 0.014[2] | 0.0 | 97 |
| 2 | 5.3 | 0.013 | 0.427 | 97 | 0.013[2] | 0.0 | 97 |
| 3 | 4.6 | 0.003 | 0.437 | 99 | 0.003[2] | 0.0 | 99 |
| 4 | 4.2 | 0.006 | 0.434 | 99 | 0.006[2] | 0.0 | 99 |
| 5 | 3.7 | 0.005 | 0.435 | 99 | 0.005[2] | 0.0 | 99 |
| 6 | 3.0 | 0.012 | 0.428 | 97 | 0.012[2] | 0.0 | 97 |
| 7 | 2.5 | 0.012 | 0.428 | 97 | 0.012[2] | 0.0 | 97 |

[1]Process run as a continuous metallic reduction followed by hydrolysis/coagulation treatment.
[2]No change was noted in selenium concentration within accuracy limits of analytical analysis technique employed to that obtained after the reduction step.

EXAMPLE II

The test of Example I is repeated with water having a selenium concentration of 0.120 milligrams per liter and a treating agent comprising metallic iron powder. The results of the analyses and test conditions are set forth in Table II.

TABLE II

| Test No. | pH | Reduction Column Effluent Se Concentration, mg/l | Se Removed In Reduction Column, mg/l | Reduction Column Extraction Efficiency, % | Hydrolysis[1] & Coagulation Effluent Se Concentration, mg/l | Se Removed In Hydrolysis & Coagulation Unit, mg/l | Cumulative Extraction Efficiency, % |
|---|---|---|---|---|---|---|---|
| 1 | 5.3 | 0.026 | 0.094 | 78 | 0.026[2] | 0.0 | 78 |
| 2 | 5.0 | 0.016 | 0.104 | 87 | 0.016[2] | 0.0 | 87 |
| 3 | 4.0 | 0.013 | 0.107 | 89 | 0.013[2] | 0.0 | 89 |
| 4 | 3.5 | 0.014 | 0.106 | 88 | 0.014[2] | 0.0 | 88 |

[1]Process run as a continuous metallic reduction followed by hydrolysis/coagulation treatment.
[2]No change was noted in selenium concentration within accuracy limits of analytical analysis technique employed to that obtained after the reduction step.

EXAMPLE III

The test of Example I is repeated with water having a selenium concentration of 0.120 milligram per liter and a treating agent comprising zinc granules (+40 mesh). The results of the analyses and test conditions are set forth in Table III.

TABLE III

| Test No. | pH | Reduction Column Effluent Se Concentration, mg/l | Se Removed In Reduction Column, mg/l | Reduction Column Extraction Efficiency, % | Hydrolysis & Coagulation Effluent Se Concentration, mg/l | Se Removed In Hydrolysis & Coagulation Unit, mg/l | Cumulative Extraction Efficiency, % |
|---|---|---|---|---|---|---|---|
| 1[1] | 5.5 | 0.112 | 0.008 | 7 | 0.104 | 0.008 | 13 |
| 2[2] | 2.5 | 0.045 | 0.075 | 63 | 0.045 | 0.0 | 63 |

[1]Average values over 8 hrs. of continuous operation.
[2]Average values over 6 hrs. of continuous operation.

EXAMPLE IV

The test of Example I is repeated with water having a selenium concentration of 0.120 milligram per liter and a treating agent comprising copper mesh. The results of the analyses and test conditions are set forth in Table IV.

TABLE IV

| Test No. | pH | Reduction Column Effluent Se Concentration, mg/l | Se Removed In Reduction Column, mg/l | Reduction Column Extraction Efficiency, % | Hydrolysis & Coagulation Effluent Se Concentration, mg/l | Se Removed In Hydrolysis & Coagulation Unit, mg/l | Cumulative Extraction Efficiency, % |
|---|---|---|---|---|---|---|---|
| 1 | 5.3 | 0.112 | 0.008 | 6 | — | — | — |
| 2 | 3.6 | 0.116 | 0.004 | 3 | 0.105 | 0.011 | 12 |
| 3 | 3.4 | 0.112 | 0.008 | 6 | 0.105 | 0.007 | 12 |
| 4 | 2.7 | 0.118 | 0.002 | 2 | 0.102 | 0.016 | 7 |
| 5 | 2.5 | 0.115 | 0.005 | 4 | 0.106 | 0.009 | 12 |

EXAMPLE V

The test of Example I is repeated with water having a selenium concentration of 0.120 milligram per liter and a treating agent comprising manganese metal flakes (−8+20 mesh). The results of the analyses and test conditions are set forth in Table V.

TABLE V

| Test No. | pH | Reduction Column Effluent Se Concentration, mg/l | Se Removed In Reduction Column, mg/l | Reduction Column Extraction Efficiency, % | Hydrolysis & Coagulation Effluent Se Concentration, mg/l | Se Removed In Hydrolysis & Coagulation Unit, mg/l | Cumulative Extraction Efficiency, % |
|---|---|---|---|---|---|---|---|
| 1[1] | 5.5 | 0.113 | 0.007 | 6 | 0.102 | 0.011 | 15 |
| 2[2] | 2.5 | 0.113 | 0.007 | 6 | 0.100 | 0.013 | 17 |

[1]Average values over 8 hrs. of continuous operation.
[2]Average values over 5 hrs. of continuous operation.

EXAMPLE VI

The test of Example I is repeated with water having a selenium concentration of 0.120 milligram per liter and a treating agent comprising magnesium metal chips. The results of the analyses and test conditions are set forth in Table VI.

TABLE VI

| Test No. | pH | Reduction Column Effluent Se Concentration, mg/l | Se Removed In Reduction Column, mg/l | Reduction Column Extraction Efficiency, % | Hydrolysis & Coagulation Effluent Se Concentration, mg/l | Se Removed In Hydrolysis & Coagulation Unit, mg/l | Cumulative Extraction Efficiency, % |
|---|---|---|---|---|---|---|---|
| 1[1] | 5.0 | 0.112 | 0.008 | 7 | 0.105 | 0.007 | 12 |

[1]Average values over 3 hrs. of continuous operation.

EXAMPLE VII

The test of Example I is repeated with water having a selenium concentration of 0.120 milligram per liter and a treating agent comprising aluminum metal granules (8×20 mesh). The results of the analyses and test conditions are set forth in Table VII.

TABLE VII

| Test No. | pH | Reduction Column Effluent Se Concentration, mg/l | Se Removed In Reduction Column, mg/l | Reduction Column Extraction Efficiency, % | Hydrolysis & Coagulation Effluent Se Concentration, mg/l | Se Removed In Hydrolysis & Coagulation Unit, mg/l | Cumulative Extraction Efficiency, % |
|---|---|---|---|---|---|---|---|
| 1[1] | 2.0 | 0.111 | 0.009 | 8 | — | — | — |

[1]Average values over 8 hrs. of continuous operation.

The results of the tests clearly demonstrate the superior effectiveness of the metallic iron treating agent of the present invention in comparison to other reducing agents. Reduction in the selenium concentration employing metallic iron as the treating agent generally is found to be at least about 75 percent to greater than 99 percent.

While the subject invention has been described with regard to the preferred embodiment thereof, it is to be understood that changes can be made in the process and apparatus employed without departing from the spirit and scope of the invention as set forth in the appended claims.

What is claimed is:
1. A process comprising:
  providing an aqueous solution containing selenium ions in the Se(VI) oxidation state;
  providing a quantity of metallic iron;
  adjusting the pH level of said aqueous solution to a level below about 6.0;
  admixing said aqueous solution and metallic iron to reduce at least a portion of said selenium ions in the Se(VI) oxidation state to at least the Se(IV) oxidation state and oxidize a portion of said metallic iron and dissolve said oxidized portion of said metallic iron in said aqueous solution;
  hydrolyzing at least a portion of said dissolved oxidized iron to form ferric hydroxide that precipitates from said aqueous solution; and
  separating at least a portion of said aqueous solution from at least a portion of said precipitated ferric hydroxide, said separated aqueous solution having a reduced concentration of selenium ions in the Se(VI) and lower oxidation states.

2. The process of claim 1 wherein the pH level is adjusted to a level in the range of from about 3.0 to about 5.5.

3. The process of claim 1 wherein the pH adjustment is effected by addition of a mineral acid to said aqueous solution.

4. The process of claim 1 wherein said pH level adjustment is effected after admixing said aqueous solution with said metallic iron.

5. The process of claim 1 wherein said metallic iron is in particulate or shredded form.

6. The process of claim 1 wherein said metallic iron is provided in a quantity in excess of the stoichiometric amount of metallic iron required to react with all of the selenium ions present in the Se(VI) oxidation state in said aqueous solution to reduce said selenium ions to a lower oxidation state.

7. The process of claim 1 wherein the temperature level of the aqueous solution during admixing with the metallic iron is in the range of from about 15° C. to about 35° C.

8. The process of claim 1 wherein the temperature level of the aqueous solution during admixing with the metallic iron is the ambient temperature of the aqueous solution.

* * * * *